Nov. 17, 1925.
J. MACIĄG
1,561,475
ADJUSTABLE TONGUE AND GROOVE PLANE
Filed March 19, 1925
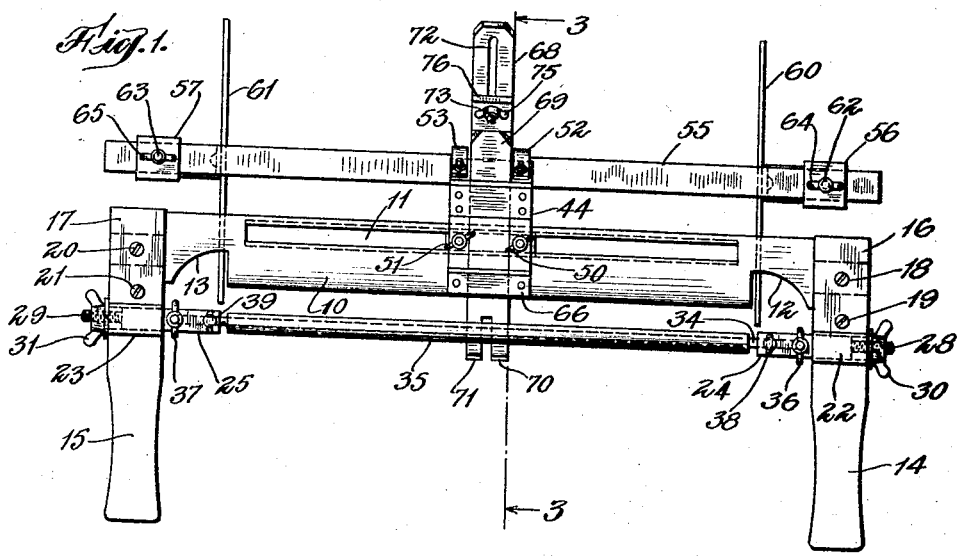
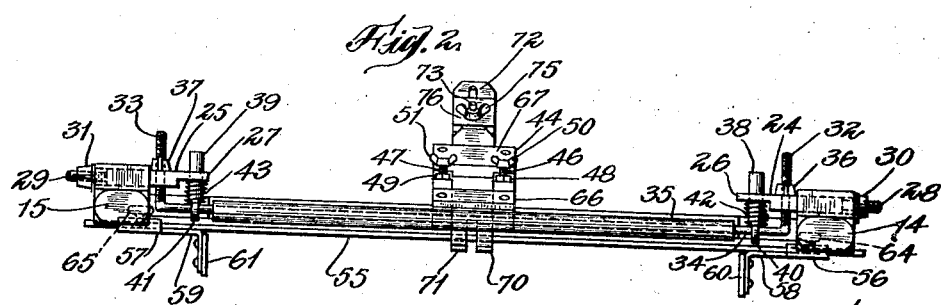
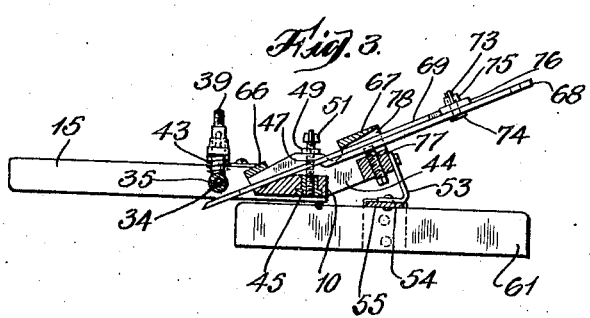
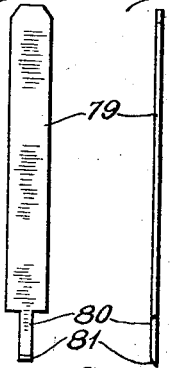
Inventor
John Maciąg Patented Nov. 17, 1925.

1,561,475

UNITED STATES PATENT OFFICE.

JOHN MACIĄG, OF ROME, NEW YORK.

ADJUSTABLE TONGUE-AND-GROOVE PLANE.

Application filed March 19, 1925. Serial No. 16,695.

*To all whom it may concern:*

Be it known that I, JOHN MACIĄG, a citizen of Poland, and resident of Rome, in the county of Oneida and State of New York, have invented certain new and useful Adjustable Tongue-and-Groove Planes, of which the following is a specification.

This invention relates to improvements in wood-working tools, particularly to an adjustable tongue and groove plane, and it is the principal object of the invention to provide a hand manipulated plane allowing a manifold adjustment of the tool and its guides in their relation to the work-piece for a multitude of purposes.

Another object of the invention is the provision of a planer allowing an adjustment of the inclination of the cutter tool to the work-piece and a regulation of the depth of the cut to be made.

A further object of the invention is a provision of a tool of this character having properly adjustable guides for guiding it along the work-piece and for allowing an adjustment to the width of the work-piece.

A still further object of the invention is the provision of a tool of the above type allowing an adjustment of the cutter for operation on any desired place or point of the work-piece and for locking the parts in their adjusted positions.

It is also one of the objects of the invention to provide a tool of the type in question in which the cutter blade is frictionally held and guided and in which means are provided to limit the backwards movement of the cutter.

Further objects of the invention are the provision of a plane which is conveniently manipulated by the hands and is for this purpose equipped with two removable handles, and a guide roller for guiding the tool during its operation over the work-piece and having means connected therewith for determining the position of the guide roller in its relation to the work-piece and a regulation of the pressure with which it engages the work-piece.

These and other objects and advantages of my invention will become more fully known as the description thereof proceeds, and will then be more specifically pointed out in the appended claims.

In the accompanying drawing, forming a material part of this disclosure:

Fig. 1 is a top plan view of my adjustable tongue and groove plane constructed according to the invention.

Fig. 2 is a front edge elevation thereof.

Fig. 3 is a cross-section on line 3—3 of Figure 1.

Fig. 4 shows a modified cutting tool in front elevation.

Fig. 5 is an edge view thereof.

The tool comprises a frame bar 10 wider in thickness at its rear edge than at its blade-like front edge and having a longitudinal slot therein, designated 11 near its wider rear edge and parallel thereto.

This bar is preferably made from hard wood and is partly cut away near its ends, as shown at 12 and 13, while its extreme outer ends are reduced and fit to engage suitable openings in the inner ends of a pair of handles 14 and 15 held in position on said reduced ends of bar 10 by means of metal mountings 16 and 17 covering the front as well as the rear faces of the handle ends and held thereon by means of a plurality of screws 18, 19 and 20, 21 or similar fastening means passed through mountings, handle ends and bar ends to firmly hold the handles on bar 10.

The mountings are formed at their front or upper faces with sleeves 22, 23 adapted to receive laterally therein blocks 24, 25 having reduced inner ends 26, 27, while their outer ends are formed into screw bolts 28, 29 which project over the lateral faces of the handles for the reception of the wing nuts 30, 31.

The blocks 24, 25 have openings near the ends thereof, adjacent to the sleeves 22, 23, allowing the passage of the angularly bent ends 32 and 33 of a bar 34 carrying between the blocks 24, 25 a guide roller 35. The ends 32 and 33 of bar 34 are threaded and carry wing nuts 36, 37 and in this manner a limited adjustment of the roller in its relation to the work-piece thereunder, is possible and a holding of the parts in their mutual adjusted positions.

In order to produce a downward pressure on bar 34 carrying the roller 35 against the work-piece, pins 38, 39 are provided, having lower I-shaped ends 40, 41 through which the bar 34 extends, and between the lower faces of the reduced parts 26, 27 and the I-shaped ends 40, 41 spiral springs 42, 43 are wound about the pins 38, 39.

A carriage, generally designated 44, is slidably guided by means of a block 45 having foot flanges engaging grooves cut into the lower face of the bar 10 to both sides of the longitudinal slot 11 therein, and screw bolts 46, 47 pass from above through the carriage side bars into block 45 and carry nuts 48, 49 adapted to engage the upper edges of the carriage side bars, and carry at their upper ends winged heads 50, 51. In this manner the carriage may be displaced in the direction of the longitudinal axis of bar 10 with the block 45 sliding within the slot 11 thereof, in either direction, and may be locked in any of its adjusted positions on said bar.

The rear face of the carriage 44 has one end of brackets 52, 53 attached thereto, the angularly bent ends of the other arms of these brackets being attached as at 54 to a bar 55 on which guide sleeves 56, 57 are displaceable at the inner ends of one arm of brackets 58, 59, the angularly bent other arms of which are secured to guide plates 60, 61 adapted to gage and guide the tool along the side edges of a work-piece, and thus allowing an adjustment of the tool to the proper width with relation to the work-piece.

A locking of the guide plates in their adjusted positions is effected by means of screw bolts or the like, designated 62, 63 and passing through the top plates of sleeves 56, 57 into engagement with bar 55 and carrying wing nuts 64, 65 at their upper ends.

The carriage 44 has two cheeks or side bars connected at the front by a bar 66 and at their rear ends by a bar or block 67 to form a guide for a support 68 for the cutter tool 69 having lower cutting edges 70, 71.

The support 68 has a longitudinal slot 72 formed therein through which a screw bolt 73 or the like extends carrying a nut 74 at its lower end and a winged head at its opposite end designated 75, and engaging a lug 76 on support 68 for allowing a limitation of the upward movement of the cutter tool 69.

The support 68 has a hole near its lower end through which is passed from below an adjusting screw 77 into engagement with the lower face of the tool which is allowed a limited movement towards the top due to a clearance space provided for this purpose and designated 78 and arranged within the upper carriage block which has a wedge-shaped cross-section as shown at 67, allowing a frictional guiding of the cutter tool and a regulation of the inclination of the tool to the work-piece within certain limits, as will be clear from a contemplation of Figure 3.

A modified form of cutter blade is illustrated in Figures 4 and 5, and the tool shown there, has a body part 79, and a reduced lower end 80 formed with a suitable cutting edge 81.

The device operates as follows:

The cutter 69 is placed onto the carriage on top of its support 68 and is then properly adjusted to the desired inclination to the work-piece by means of the proper adjustment of screw 77. The depth of the grooves to be cut into the work piece to both sides of a tongue is determined by the relative adjustment of the block 76 and somewhat by the position of the roller 35 also. It is regulated by sliding the cutter 69 longitudinally to the position desired before clamping it by screw 77. Then the wing nut 75 is manipulated to bring block 76 into engagement with the upper edge of the tool and lock the parts in their position for limiting the upward movement of the tool during its operation. Now the tool and its carriage are shifted to the proper place where the grooves are to be cut into the work-piece, by shifting the carriage 44 and locking the same by means of the proper manipulation of the wing nuts 50, 51. Then the guide plates 60, 61 are adjusted to engage the side edges of the work piece and are locked in their adjusted positions by means of the screws 64, 65.

When now the guide roller 35 is properly adjusted to engage the upper face of the work-piece and the tension is regulated to a proper degree by means of the nuts 36, 37, the tool may be gripped by the handles 14, 15 and operated in the well known manner to cut grooves and to form a tongue thereby in the work-piece.

It is to be understood, that changes may be made in the general arrangement and in the construction of the minor details of my plane without departure from the scope of the invention as defined in the appended claims, and without changing the spirit of the invention.

Having thus described my invention, what I claim as new and desire to secure by Letters Patent is:

1. In an adjustable tongue and groove plane, a bar, a pair of handles secured to the ends of said bar, mountings securing said handles to said bar, sleeves formed with said mountings, perforated blocks guided in said sleeves, having a reduced inner end, a pin formed at the opposite ends of said bars extending through said sleeves, and wing nuts on said pins, a bar having angularly bent ends extending through the perforations of said blocks, wing nuts at these ends, a roller on said bar, pins having I-shaped lower ends through which said bar is passed, said pins projecting through perforations in said blocks, springs wound about said pins between said I-shaped ends and said reduced ends of said blocks to permit the adjustment of said bar and its roller toward and from the work piece, a carriage and a cutter on said carriage mounted for lateral adjustment on said bar and adapted to be guided over a work piece by the manipulation of said handles.

2. In an adjustable tongue and groove plane, a frame including a slotted longitudinal bar, a pair of handles at the ends of said bar, a roller in front of and below said bar for engaging the work-piece, a bar on which said roller is mounted, connections between said last named bar and said handles, means for permitting the adjustment of said roller bar and its roller toward and from the work piece, a carriage, and a cutter on said carriage mounted for lateral adjustment on said slotted bar, and adapted to be guided over a work-piece by the manipulation of said handles.

3. In an adjustable tongue and groove plane, a frame including a longitudinally extending, slotted bar having reduced ends, mountings secured to the reduced ends of said bar, sleeves formed with said mountings, perforated blocks guided in said sleeves having reduced inner ends, a bar in front of and below the level of said slotted bar having upturned ends adapted to be passed through the perforations of said blocks, wing heads on said blocks, wing nuts upon the upper ends of said upturned bar ends, a roller on said last named bar, pins having I-shaped lower ends through which said bar is passed, said pins projecting also through perforations in said blocks, springs wound about said pins between said I-shaped ends and the reduced ends of said blocks to permit the adjustment of said bar and its roller toward and from the work piece, a cutter and its carriage on said frame bar, and means for laterally adjusting said carriage and cutter on said bar and allowing a guidance of the same over the work-piece by the manipulation of said handles.

Signed at New York in the county of Oneida and State of New York this 9 day of March A. D. 1925.

JOHN MACIĄG.